United States Patent [19]

Matsunaga et al.

[11] 3,992,496

[45] Nov. 16, 1976

[54] PROCESS FOR PRODUCING POROUS THERMOPLASTIC RESIN SHEET

[75] Inventors: Hiroomi Matsunaga, Kobe; Kozo Tsuji; Masashi Watanabe, both of Ibaragi, all of , Japan

[73] Assignees: Sumitomo Chemical Company, Limited, Osaka; Hayashibara Biochemical Labs., Inc., both of Japan

[22] Filed: Mar. 13, 1975

[21] Appl. No.: 557,990

[30] Foreign Application Priority Data

Mar. 15, 1974  Japan.................................. 49-30209

[52] U.S. Cl. .............................. 264/49; 260/2.5 E; 260/17.4 ST; 264/175
[51] Int. Cl.² ...................... B29D 27/00; B29D 7/14
[58] Field of Search ............. 264/126, 127, 49, 175; 260/17.4 ST, 2.5 E

[56] References Cited
UNITED STATES PATENTS

| | | |
|---|---|---|
| 2,700,694 | 1/1955 | Fernald............................. 264/49 X |
| 2,707,201 | 4/1955 | Fernald et al..................... 264/49 X |
| 2,894,289 | 7/1959 | Harper et al........................... 264/49 |
| 3,262,834 | 7/1966 | Abell et al. ..................... 264/127 X |
| 3,536,796 | 10/1970 | Rock................................... 264/49 |
| 3,551,210 | 12/1970 | Bahler et al. .................. 264/126 X |
| 3,574,150 | 4/1971 | Jefferson et al. .................... 260/2.5 |
| 3,784,390 | 1/1974 | Hijiya....................... 260/17.4 ST X |
| 3,888,809 | 6/1975 | Nakashio et al. ............ 260/17.4 ST |

*Primary Examiner*—Philip Anderson
*Attorney, Agent, or Firm*—Stevens, Davis, Miller & Mosher

[57] ABSTRACT

A porous thermoplastic resin sheet is obtained by molding into a sheet a mixture comprising 100 parts by weight of a thermoplastic resin and 0.1 to 50 parts by weight of a pullulan powder, and then immersing the resulting thermoplastic resin sheet in water to dissolve-out and remove the said pullulan powder.

5 Claims, No Drawings

PROCESS FOR PRODUCING POROUS THERMOPLASTIC RESIN SHEET

This invention relates to a porous thermoplastic resin sheet having gas and moisture permeability. More particularly, the invention pertains to a porous thermoplastic resin sheet best suitable for use as any of construction materials, clothings, furniture, leather-like articles, filter plates, diaphragms, etc.

Many processes for providing penetrated fine holes in a thermoplastic resin sheet to impart gas, moisture or water permeability to the sheet have already been proposed. These processes may be classified into (A) a process in which the sheet is mechanically perforated, (B) a process in which a mixture comprising a thermoplastic resin and a powder of a water-soluble substance such as polyvinyl alcohol is molded into the form of a sheet, and then the sheet is washed with water to dissolve-out the water-soluble substance, thereby forming fine holes in the sheet, and (C) a process in which a solution of a thermoplastic resin in a mixed solvent comprising volatile good solvent and non-solvent is spread to the form of a thin sheet, and then the solvent is volatilized at a temperature below the softening temperature of the dissolved resin to form interconnected fine holes in the sheet.

However, the process (A) is inefficient and cannot form holes but those which are relatively large in diameter; the process (B) requires a long period of time for removal of the water-soluble substance by water-washing; and the process (C) has such drawbacks that for dissolution of the resin, the solvent is ordinarily required to be used in an amount of several times to 10 and more times the amount of the resin, and that complex steps are required to be employed.

With an aim to overcome the drawbacks of the above-mentioned conventional processes, the present inventors conducted extensive studies to find that when a pullulan powder is used as the water-soluble substance in the process (B), the disadvantages of said process can be overcome to make it possible to dissolve-out and remove the water-soluble substance with ease and in a short period of time. Based on the above finding, the inventors have accomplished the present invention.

An object of the present invention is to provide a porous thermoplastic resin sheet having gas, moisture or water permeability.

Another object of the invention is to provide a process for producing the above-mentioned resin sheet.

Other objects and advantages of the invention will become apparent from the following description.

According to the process of the present invention, it is possible to obtain a porous thermoplastic resin sheet by mixing a thermoplastic resin with a pullulan powder, molding the resulting mixture into a thermoplastic resin sheet by use of a calender roll or the like, and then immersing the resin sheet in water to dissolve-out and remove the said pullulan powder.

The pullulan referred to in the present invention is such a linear high polymer that units of maltotriose, which is a trimer of glucose, have been repeatedly bonded through an $\alpha$-1,6 linkage which are different from those of said trimer, and has the molecular structure represented by the formula,

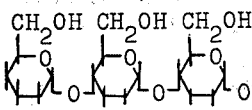
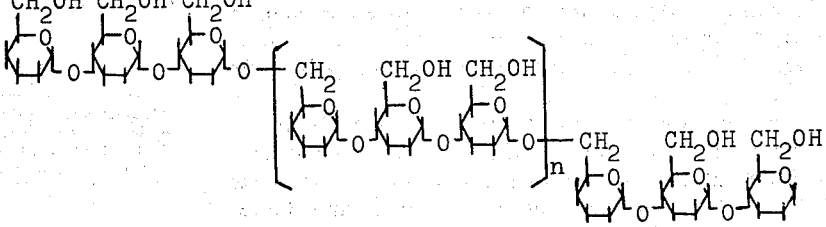

wherein $n$ is an integer of 10 to 10,000 and shows the polymerization degree.

The pullulan is a white powder which is easily soluble in water, and is a substance unknown in the field of plastic-processing.

The pullulan used in the present invention is not particularly limited in process for production thereof. At present, it can be isolated and recovered as a tacky substance secreted in a culture liquor of a strain belonging to the genus Pullularia which is an incomplete microorganism. That is, a strain of the species *Pullularia pullulans* is subjected to shaking culture at 24° C. for 5 days in a medium containing 10% of partially hydrolyzed starch, 0.5% of $K_2HPO_4$, 0.1% of NaCl, 0.02% of $MgSO_4\cdot7H_2O$, 0.06% of $(NH_4)_2SO_4$ and 0.04% of yeast extract. If necessary, the cells are removed by centrifugation from the culture liquor, and the supernatant is charged with methanol to deposit a pullulan precipitate. After repeating water dissolution and methanol precipitation, purified pullulan can be obtained. Pullulan somewhat varies in physical properties depending on the kind of strain used. This, however, is not greatly connected to the properties of pullulan as a material to be dissolved out.

The molecular weight of the pullulan used in the present invention is not particularly limited but, for the use thereof in the process of the present invention, is preferably 5,000 to 5,000,000, more preferably 5,000 to 1,000,000, in view of the operation of dissolving-out and removal of the pullulan with water.

Examples of the thermoplastic resin used in the present invention are general thermoplastic resins such as polyvinyl chlorides, polypropylenes, high-, medium- and low-pressure process polyethylenes, polystyrenes, ethylene-vinyl acetate copolymer and ethylene-acrylic acid copolymer.

The amount of the pullulan powder to be added to the thermoplastic resin is 0.1 to 50 parts, preferably 5 to 30 parts, by weight per 100 parts by weight of the thermoplastic resin. If necessary, the mixture of the thermoplastic resin with the pullulan powder may be incorporated with a stabilizer and a plasticizer for the said thermoplastic resin. The mixing of the thermoplastic resin with the pullulan powder is carried out according to an ordinary procedure using a home mixer, a kneader, a drum blender, a Brabender plastograph and a super mixer.

The process for molding a mixture of the thermoplastic resin with pullulan into a sheet is not particularly limited, and may be any of molding process using a calender roll, extrusion molding process using a T-die, press-molding process using a hot-press, or molding process in which a plastisol formed by mixing the thermoplastic resin with pullulan is coated on a flat plate and then subjected to heat treatment.

The thus obtained pullulan-incorporated thermoplastic resin sheet is then immersed in water at 0° to 100° C., preferably 20° to 80° C. for 10 to 180 minutes, preferably 30 to 60 minutes, to remove the pullulan by dissolving it out into the water, whereby continuous and discontinuous pores can be formed in the resin sheet.

A conventional thermoplastic resin sheet of this kind has no air permeability at all, and hence has had such disadvantage that when used as a wall-decorating sheet by applying an optional pattern onto the surface thereof, the sheet tends to form dew-drops with ease when the humidity is high. However, the thermoplastic resin sheet molded according to the present invention has homogeneously formed therein fine holes of less than 10 microns in diameter, and thus has air permeability (breathing property), so that there is no such fear that dew-drops are formed even when the sheet is used as a wall-decorating sheet.

The present invention is illustrated in detail below with reference to examples, but the invention is not limited to the examples.

EXAMPLE 1

| | |
|---|---|
| Vinyl chloride resin (tradename: Sumilit PXN, produced by Sumitomo Chemical Co.; degree of polymerization: 1300) | 100 parts |
| Plasticizer (dioctyl phthalate) | 60 parts |
| Stabilizer (tradename: KP-150, produced by Kyodo Pharmaceutical Co.; complex stabilizer containing Cd, Ba and Zn diluted in kerosene) | 2 parts |
| Pullulan (molecular weight: 70,000) | 30 Parts |

The above-mentioned components were sufficiently kneaded by means of a mortar to form a homogeneous plastisol. The plastisol was placed on an aluminum plate having a thickness of 0.5 mm. to prepare a sheet of 1 mm. in thickness by use of an applicator. This sheet was heat-treated for 10 minutes in a hot air dryer kept at 180° C., cooled, and then immersed for 10 minutes in hot water at 70° C. to dissolve-out and remove the pullulan, whereby a porous vinyl chloride sheet was obtained. When the smoke from a cigarette was blown to the thus obtained sheet, the smoke passed through the sheet with ease.

EXAMPLE 2

| | |
|---|---|
| High density polyethylene powder (tradename: Sumikathene Hard 2608, produced by Sumitomo Chemical Co.; melt index: 15; density: 0.960) | 100 parts |
| Pullulan (molecular weight: 70,000) | 15 parts |

The above-mentioned components were dryblended and then hot-pressed at 190° C. for 10 minutes to prepare a sheet of 1 mm. in thickness. This sheet was freed from the pullulan in the same manner as in Example 1 to obtain a porous high density polyethylene sheet. When the smoke from a cigarette was blown to the thus obtained sheet, the smoke passed through the sheet with ease.

EXAMPLE 3

| | |
|---|---|
| Polypropylene powder (tradename: Sumitomo-Noblen SF-2011, produced by Sumitomo Chemical Co.; melt index: 2; density: 0.910) | 100 parts |
| Pullulan (molecular weight: 10,000) | 15 parts |

The above-mentioned components were dryblended and then hot-pressed at 230° C. for 10 minutes to prepare a sheet of 1 mm. in thickness. This sheet was freed from the pullulan in the same manner as in Example 1 to obtain a porous polypropylene sheet. When the smoke of a cigarette was blown to the thus obtained sheet, the smoke passed through the sheet with ease.

COMPARATIVE EXAMPLE 1

| | |
|---|---|
| Vinyl chloride resin (tradename: Sumilit PXN, produced by Sumitomo Chemical Co.; degree of polymerization: 1300) | 100 parts |
| Plasticizer (dioctyl phthalate) | 60 parts |
| Stabilizer (tradename: KP-150, produced by Kyodo Pharmaceutical Co.; complex stabilizer containing Cd, Ba and Zn diluted in kerosene.) | 2 parts |

Using the above-mentioned components, a sheet of 1 mm. in thickness was prepared in the same manner as in Example 1. This sheet was immersed for 1 hour in hot water at 70° C., and then subjected to the cigarette smoke test, but the smoke did not passed through the sheet at all.

What is claimed is:

1. A process for producing a porous thermoplastic resin sheet, characterized by molding into a sheet a mixture comprising 100 parts by weight of a thermoplastic resin and 0.1 to 50 parts by weight of a pullulan powder, and then immersing the thermoplastic resin sheet in water to dissolve-out and remove the said pullulan powder.

2. A process according to claim 1, wherein the thermoplastic resin is polyvinyl chloride, polypropylene, low-, medium- and high-pressure process polyethylene, polystyrene, ethylene-vinyl acetate copolymer or ethylene-acrylic acid copolymer.

3. A process according to claim 1, wherein the molecular weight of the pullulan is 5,000 to 5,000,000.

4. A process according to claim 1, wherein the temperature of the water is 0° to 100° C.

5. A process according to claim 1, wherein the thermoplastic resin is immersed in water for 10 to 180 minutes.

* * * * *